(12) United States Patent
Sugata et al.

(10) Patent No.: US 7,367,756 B2
(45) Date of Patent: May 6, 2008

(54) WORK PHASE DETERMINATION METHOD FOR MACHINE TOOLS, AND DEVICE THEREFOR

(75) Inventors: Shinsuke Sugata, Fukuyama (JP); Tadashi Makayama, Onomichi (JP)

(73) Assignee: Horkos Corp, Fukuyama (JP)

( * ) Notice: Subject to any disclaimer, the term of this patent is extended or adjusted under 35 U.S.C. 154(b) by 584 days.

(21) Appl. No.: 10/528,703

(22) PCT Filed: Oct. 22, 2003

(86) PCT No.: PCT/JP03/13502

§ 371 (c)(1),
(2), (4) Date: Mar. 22, 2005

(87) PCT Pub. No.: WO2004/037485

PCT Pub. Date: May 6, 2004

(65) Prior Publication Data

US 2006/0051171 A1    Mar. 9, 2006

(30) Foreign Application Priority Data

Oct. 28, 2002  (JP) ............................. 2002-312178

(51) Int. Cl.
*B23B 35/00* (2006.01)
*B23B 41/12* (2006.01)

(52) U.S. Cl. .......................... 408/1 R; 408/13; 408/89; 409/199; 33/642

(58) Field of Classification Search ................ 408/1 R, 408/2, 4, 13, 89; 409/188–189, 198–199, 409/195, 205, 218, 220; 82/106; 451/9, 451/11, 8, 49, 242; 33/550–551, 534, 553, 33/555.1, 630, 642; *B23B 41/12, 5/18; B23C 3/06*
See application file for complete search history.

(56) References Cited

U.S. PATENT DOCUMENTS 3,740,160 A * 6/1973 Kimura et al. ............... 408/2
5,066,176 A * 11/1991 Johnstone ................... 409/133

(Continued)

FOREIGN PATENT DOCUMENTS

EP          484834 A1 *   5/1992

(Continued)

*Primary Examiner*—Daniel W. Howell
(74) *Attorney, Agent, or Firm*—Merek, Blackmon & Voorhees, LLC

(57) ABSTRACT

In adjusting phase for work (W), the operation of mounting/dismounting a reference tool on a spindle (6) is dispensed with and so is a storage space for the reference tool, and besides, it is arranged that the thrust on the work (W) does not directly act on the spindle (6) at the time of this phase adjustment. In a machine tool in which a spindle housing (7) supporting the specifically directed spindle (6) for rotation alone is supported for parallel motion in orthogonal three-axis directions (XYZ) by a numerical control mechanism (4), in determining the phase for the work (W) is feed-rotated around a specific axis (S), it is arranged that with a reference block (9) fixed to the spindle housing (7), the work (W) is feed-rotated around the specific axis (S) to abut the phase reference section (W1) of the work against the reference block (9), so as to find the amount of feed-rotation of the work at the time of this abutment.

9 Claims, 8 Drawing Sheets

U.S. PATENT DOCUMENTS 5,144,772 A * 9/1992 Kawamata et al. ............ 451/5
6,203,478 B1 * 3/2001 Gorrochategui .............. 483/31
6,711,829 B2 * 3/2004 Sano et al. .................. 33/549

FOREIGN PATENT DOCUMENTS

| FR | 2820069 | A1 | * | 8/2002 |
|----|---------|----|---|--------|
| JP | 53043294 | A | * | 4/1978 |
| JP | 59232707 | A | * | 12/1984 |
| JP | 61-19531 | | | 1/1986 |
| JP | 7-24678 | | | 1/1995 |
| JP | 09160619 | A | * | 6/1997 |
| JP | 10244434 | A1 | * | 9/1998 |

* cited by examiner

Flow Data for Flexible Phase Determination

WORK PHASE DETERMINATION METHOD FOR MACHINE TOOLS, AND DEVICE THEREFOR

CROSS-REFERENCE TO RELATED APPLICATION

The present application claims the priority under 35 U.S.C. 119 of Japanese Patent Application No. 2002-312178, filed Oct. 22, 2002, which is hereby incorporated herein by reference in its entirety.

FIELD OF THE INVENTION

This invention relates to a work phase determination method for machine tools with spindles and a device therefor.

BACKGROUND OF THE INVENTION

There is a machine tool in which a spindle housing supporting a specifically directed spindle for rotation alone is supported for parallel motion in orthogonal three-axis directions XYZ by a numerical control mechanism (see, for example, Japanese Patent Publication No. 2001-9652).

In the machine tool, a work support-feeding device that feed-rotates a work around a specific axis is provided, and machining is carried out by feed-rotating the work at a specific angle position therearound.

To perform such a machining, it is necessary to accurately determine a phase for the work around the specific axis on the work support-feeding device. Therefore, a reference tool for phase determination is formed and installed on the spindle, and thereon, a phase determination operation is performed so as to abut the work. After the operation, the tool is detached from the spindle and stored in a specific position. (See, for example, Japanese Patent No. 3083776.)

In the above-mentioned conventional work phase determination method, working efficiency falls because the operation of mounting/dismounting the reference tool on the spindle is required. In addition, it is uneconomical because a storage space for the reference tool is required. Moreover, there is some fear of shortening bearing life because a load acts on a bearing rotatably supporting the spindle when the work abuts the reference tool.

The present invention aims to solve the above-mentioned problems.

SUMMARY OF THE INVENTION

To achieve the above-mentioned aims, in the process according to the present invention, in a machine tool having a spindle in which a spindle housing supporting the specifically directed spindle for rotation alone is supported for parallel motion in orthogonal three-axis directions XYZ by a numerical control mechanism, in determining the phase for the work to be feed-rotated around a specific axis, it is arranged that with a reference block having plane faces, fixed to the periphery of the front end of the spindle housing so as to protrude forward a little from the front end of the spindle housing, the work is feed-rotated around the specific axis to abut a phase reference section of the work against the reference block, so as to find the amount of feed-rotation (a phase angle θ of a chuck part) of the work at the time of this abutment.

In this invention, the reference block remains fixed on the spindle housing, and such a construction can be simple and inexpensive. In addition, when operating so as to determine a phase around the specific axis of the work, force is not transmitted from the work to the spindle. Accordingly, the bearing life for rotatably supporting the spindle can be prolonged.

More specifically, the reference block, which is fixed right under the spindle so as to protrude forward a little from the front end of the spindle housing, is provided with a first plane face perpendicular to a direction of the spindle and a second plane face parallel to both of the direction of the spindle and the specific axis. In determining the phase for the work to be feed-rotated about the specific axis, the work is feed-rotated around the specific axis in a first direction and/or an opposite second direction to abut the phase reference section of the work against one or each of the first plane face and the second plane face, so as to find the amount of feed-rotation (phase angles θ1, θ2 of the chuck part) of the work at the time of the abutments.

In this invention, the following effect is realized in addition to the above-mentioned effects. That is, the accuracy of the determination of a phase for the work around the specific axis by using the first plane face and the second plane face is improved.

In this invention, a crankshaft is suitable as the work, and in this case, a crank pin can be used as the phase reference section. According to this, the above-mentioned effects can be realized in the determination of the phase for the crankshaft, and besides, using the crank pin for the phase reference section can dispense with preparing a special phase reference section.

In the device according to the present invention, in a machine tool in which a spindle housing supporting a specifically directed spindle for rotation alone is supported for parallel motion in orthogonal three-axis directions XYZ by a numerical control mechanism, a reference block which a phase reference section of a work feed-rotated around a specific axis by the numerical control mechanism abuts is fixed on the reference block. The device contributes to carrying out the process according to the invention.

More specifically, in the machine tool in which the spindle housing supporting the specifically directed spindle for rotation alone is supported for parallel motion in orthogonal three-axis directions XYZ by the numerical control mechanism, the reference block is fixed at a specific position in relation to the spindle, on the spindle housing, whereas a work support-feeding device for feed-rotating the work around the specific axis perpendicular to the direction of the spindle, and a work phase deciding means for determining a phase for the work around the specific axis based on the amount of feed-rotation around it when the phase reference section feed-rotated around it abuts against the reference block displaced to a phase adjustment position with reference to the work in advance are provided. This aspect of the invention contributes to understanding the amount of feed-rotation of the work by reciprocally rotating the work around the specific axis.

In this case, the work support-feeding device comprises an intermediate table, rectangular in plan, fixed horizontally, a work driving table fixed on an end of the top face of the intermediate table, and a push table fixed on the other end thereof. In addition, the work driving device has an NC table installed to have a table main body fixed on the intermediate table, and besides, has a driving center for supporting a chuck portion supported on the table main body and rotatively driven around a specific axis of the X-axis direction by the NC table and a rotation center of an end face of the work grasped by the chuck portion. Moreover, the reference block is constructed as follows. That is, the reference block in the present invention is fixed to protrude forward a little from the front end of the spindle housing with a spindle and is provided with a first plane face perpendicular to the direction of the spindle and a second plane face parallel to both the direction of the spindle and the specific axis.

In this invention, the phase for the work around the specific axis is determined by abutting the phase reference section of the work against either of the first plane face and the second plane face. Besides, when the phase reference section of the work is abutted against both of the first plane face and the second plane face, the phase for the work around the specific axis can be determined accurately regardless of any error in its finishing dimension.

PREFERRED EMBODIMENT OF THE PRESENT INVENTION

An explanation about the present invention will follow with reference to figures.

Figure 1:
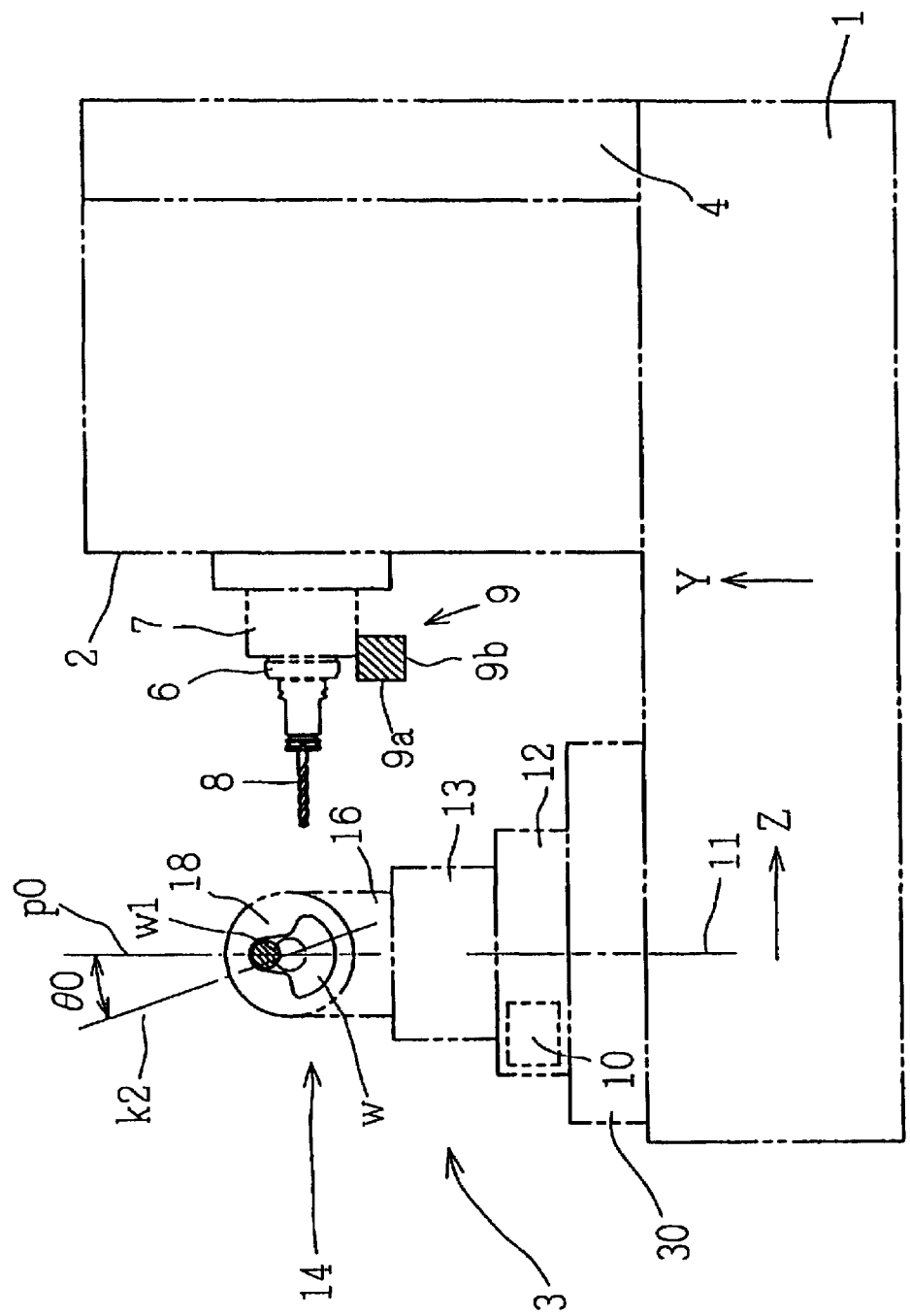
FIG. 1 is a side view of a machine tool with a spindle of the present invention, in which a part is shown in a section.
Figure 2:
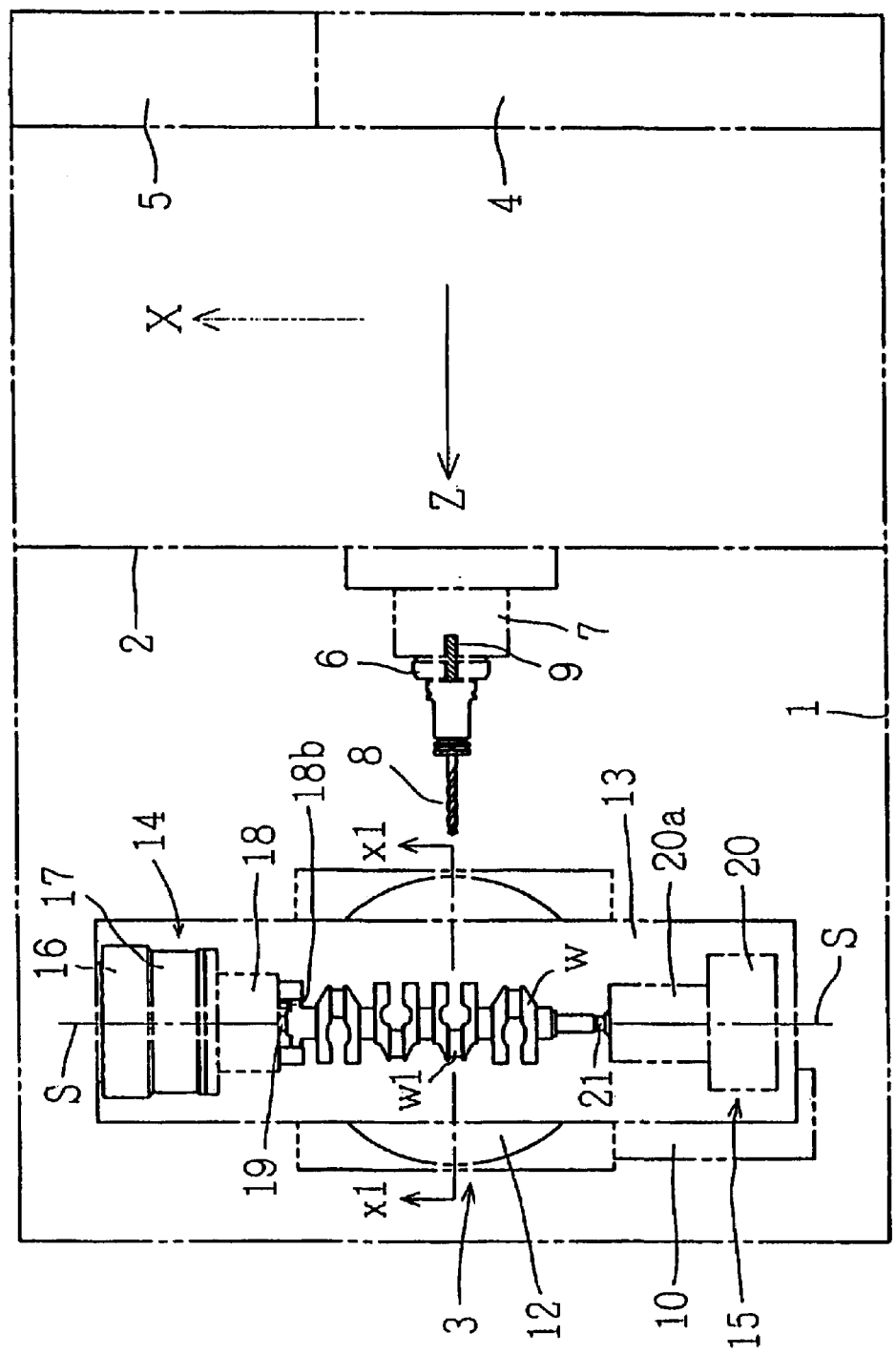
FIG. 2 is a plan view of the machine tool.
Figure 3:
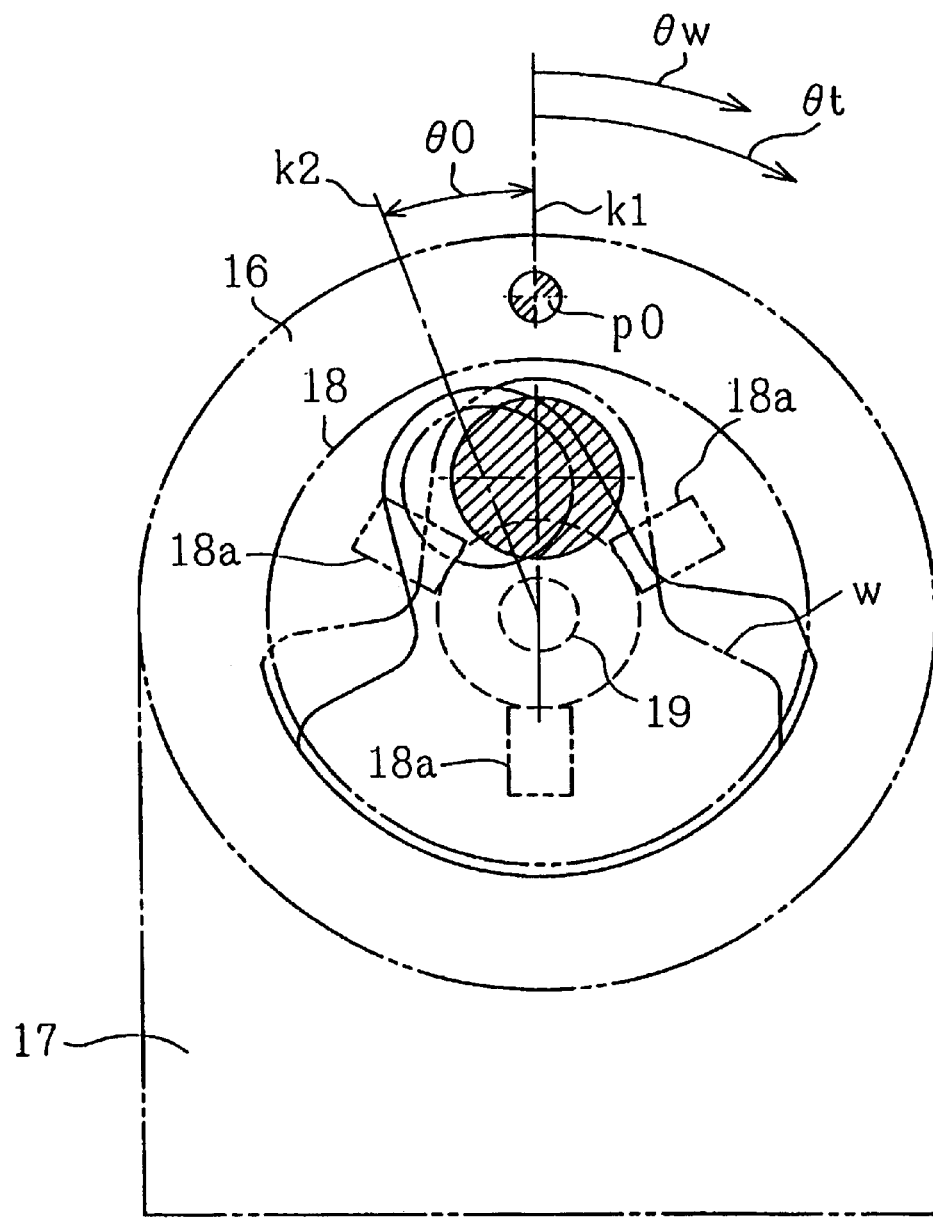
FIG. 3 is a view showing a section taken on line X1-X1 in FIG. 2.

In FIGS. 1 to 3, 1 is a bed, and thereon are provided a fixed column 2, a work support-feeding device 3, a numerical control mechanism 4 and hydropneumatic equipment 5.

A cylindrical spindle housing 7 supporting a longitudinally directed spindle 6 (in a Z-axis direction) for free rotation is mounted on the fixed column 2 in a feed-displaceable manner in an X-axis direction, a Y-axis direction and the Z-axis direction, which form orthogonal three-axis directions. A cutting tool 8 is fixed to a front end of the spindle 6.

A reference block 9 is fixed to the lowest position of a front outer peripheral face of the spindle housing 7 below the spindle 6 to protrude forward. The reference block 9 comprises a front face 9a and a lower end face 9b. Here, the front face 9a forms a first plane face perpendicular to the Z-axis direction, and the lower end face 9b forms a second plane face parallel to both of the Z-axis direction and the X-axis direction.

The work support-feeding device 3 comprises a horizontal rotating table 12, an intermediate table 13, a work drive table 14 and a center push table 15. The rotating table 12 is feed-rotated around a Z-axial directed rotation support axis 11 by a servomotor 10 provided to the bed 1. The intermediate table 13 is horizontally fixed on the rotating table 12. The work drive table 14 is fixed on one end side of an upper face of the intermediate table 13, and the push table 15 is fixed on the other end side thereof.

In this case, the work drive table 14 is provided with a table main body 17, a chuck portion 18 and a driving side center 19. The table main body 17 is fixed to the intermediate table 13 and has a NC (numerical control) table 16 installed. The chuck portion 18 is supported on the table main body 17 to be rotatively driven around a specific axis S in the X-axis direction by the NC table 16. The driving center 19 is supported on the table main body 17 and located on the specific axis S, supporting a rotating center of an end face of a work w grasped by the chuck portion 18. The chuck portion 18 has a plurality of claws 18a for grasping a work as shown in FIG. 3.

The center push table 15 is provided with a table main body 20 fixed to the intermediate table 13, a drive device 20a of the X-axis direction mounted on the table main body 20 and a push center 21. The push center 21 is slidably-displaceably supported on the table main body 20 and push-moved by the drive device 20a to support the rotating center of the other end face of the work w.

Figure 4:
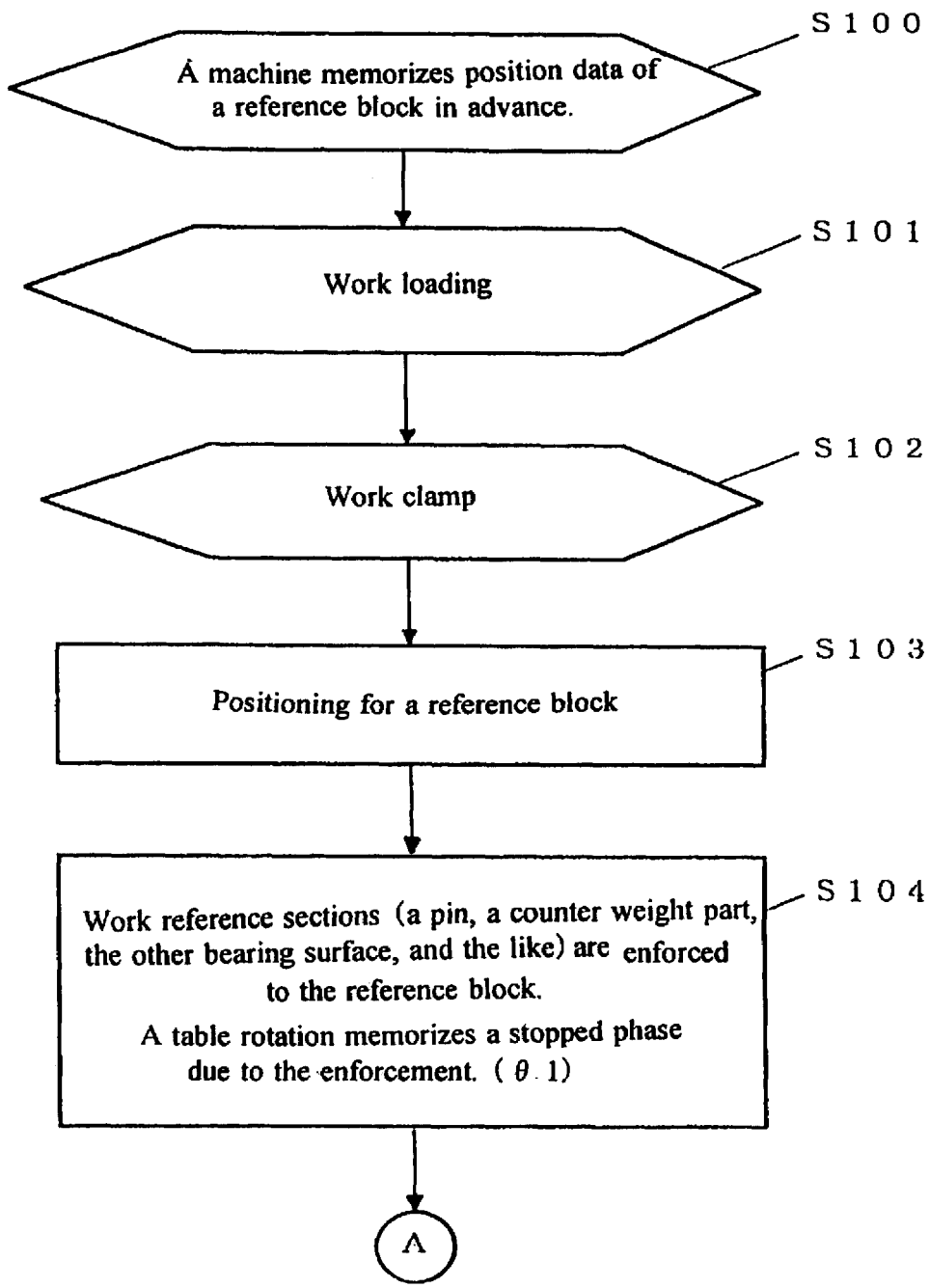
FIG. 4 is a view showing a first portion of an operating flow sheet of the present invention.
Figure 5:
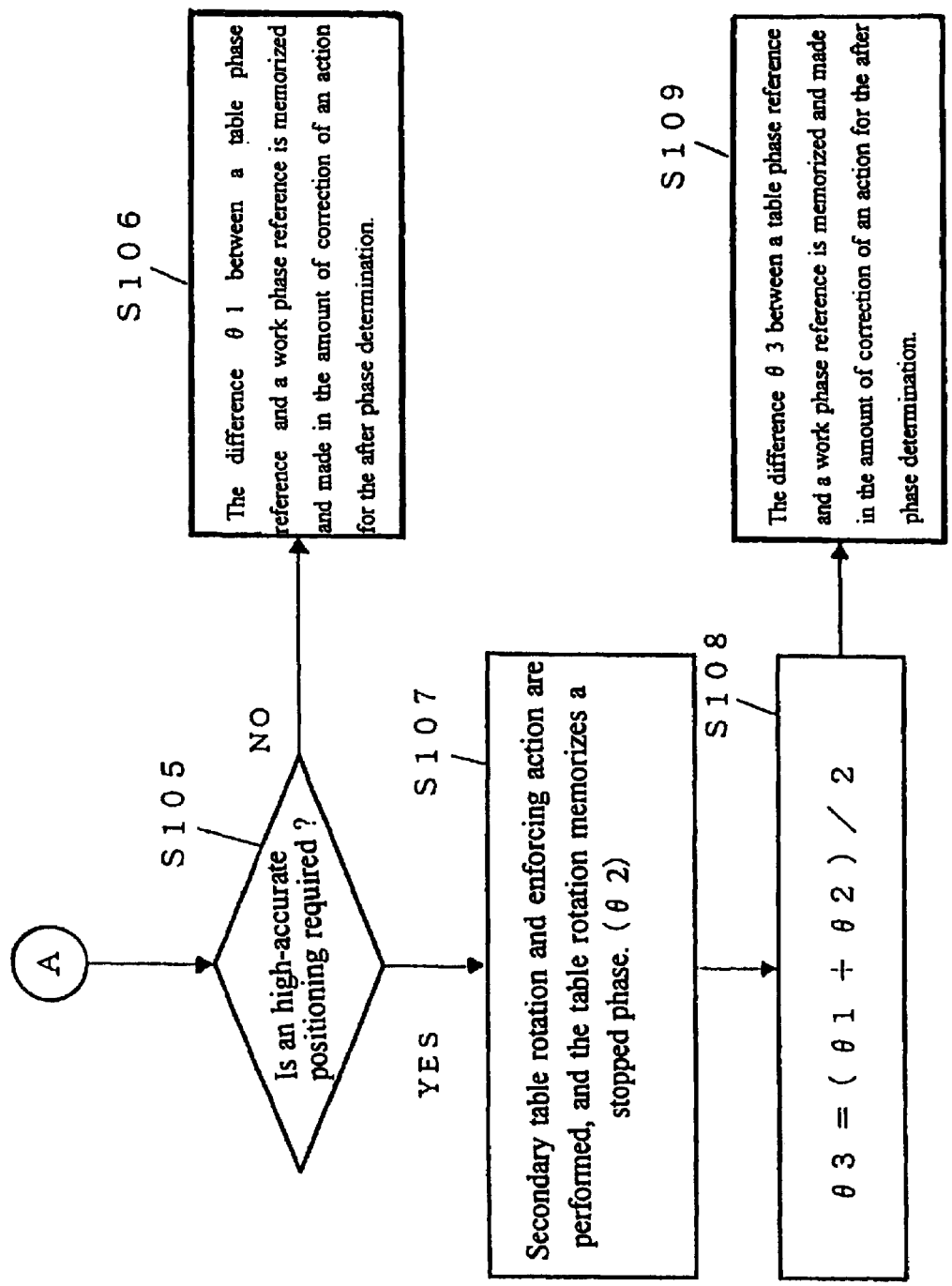
FIG. 5 is a view showing a second portion of an operating flow sheet that connects at "A" to the portion of the operating flow sheet of FIG. 4.
Figure 6:
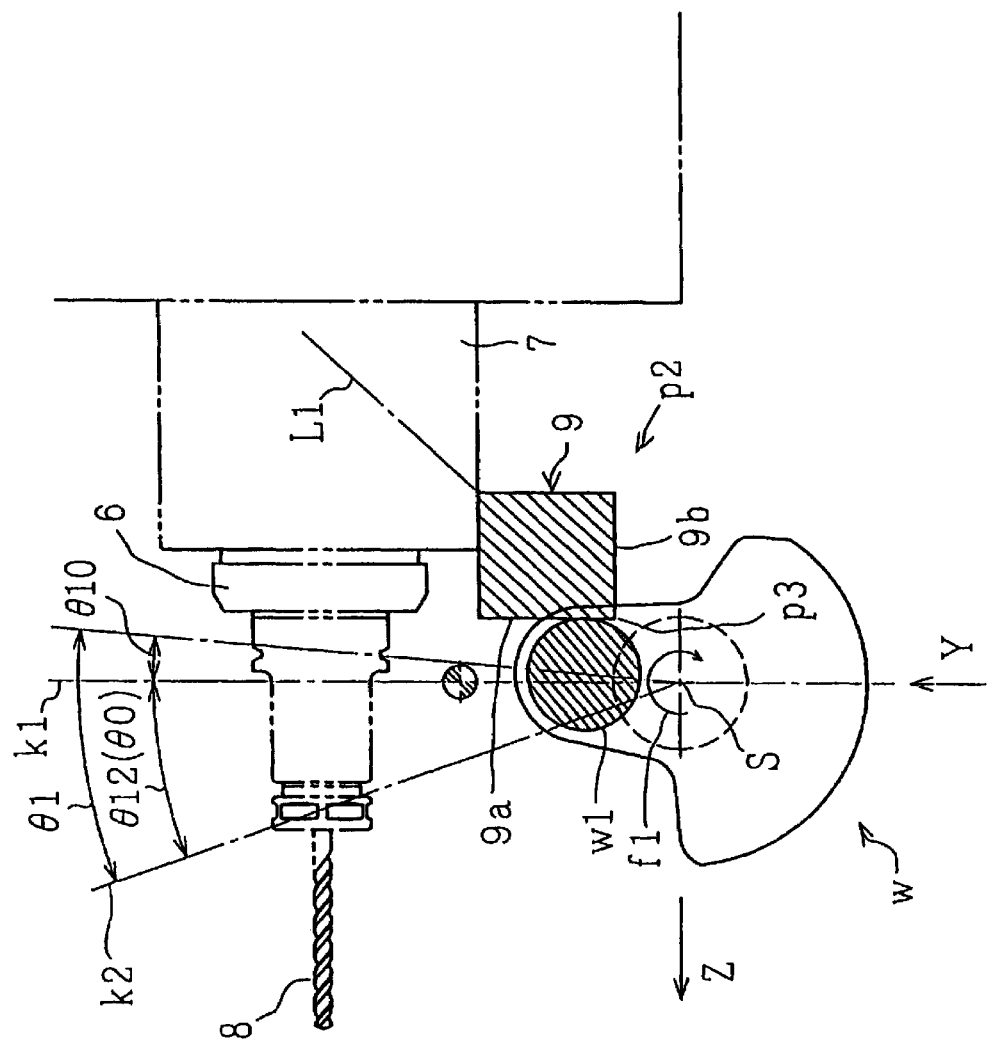
FIG. 6 is an explanatory view showing a situation in which a crank pin abuts the first plane face of a reference block of the machine tool.
Figure 7:
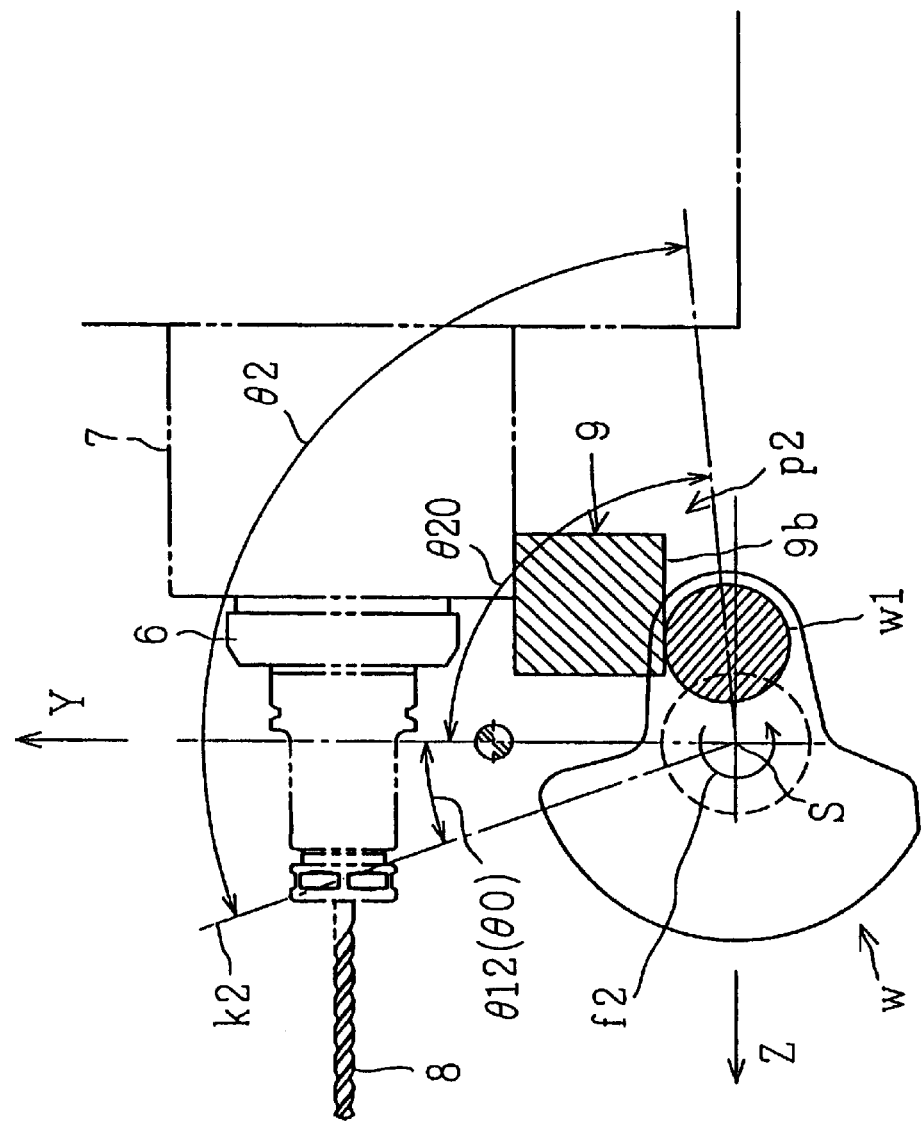
FIG. 7 is an explanatory view showing a situation in which a crank pin abuts the second plane face of the reference block.

In the above-mentioned machine tool, an example of operations before a crankshaft of the work w is started to be machined will be explained with reference to FIGS. 4 to 7. Here, FIG. 4 and FIG. 5 show two portions of an operating flow sheet. FIG. 6 is an explanatory view showing a situation in which a crank pin w is point-abutted against the first plane face 9a of a reference block 9. FIG. 7 is an explanatory view showing a situation in which the crank pin w is point-abutted against the second plane face 9b of the reference block 9.

First, in step S100, necessary data about the shape of the work w, position of the reference block 9 and programs for determining a phase and for machining the work w are input from an input device of the numerical control mechanism 4. Here, the numerical control mechanism 4 has these data memorized on its memory portion.

Next, in step S101, the numerical control mechanism 4 has the servomotor 10 operate as necessary. That is, the rotation support axis 11 is feed-rotated, the horizontal rotation table 12 rotates, and the two centers 19, 21 are positioned on the specific axis S. Besides, the NC table 16 is operated as necessary, and therefore, the chuck portion 18 is feed-rotated, and a radial line of the chuck portion in agreement with a table phase reference p0 is made a phase zero position reference k1 thereof as shown in FIG. 3. Here, the phase zero position reference k1 is an imagined one fixedly specified on the chuck portion 18, and the table phase reference p0 is an imagined one fixedly specified on the table main body 16.

Thereafter, the work w is loaded between the centers 19, 21 by a robot, an automatic feed device or manual controls and the like, and its position is temporarily kept. In this case, although care is taken that the phase of the work w around the specific axis S and the phase of the chuck portion 18 therearound closely resemble each other, it is not done to accurately match these phases because the loading must be done rapidly. Accordingly, the phase zero position reference k1 of the chuck portion 18 and a phase reference k2 of the work w (a work phase reference) are usually shifted somewhat relative to one another around the specific axis S. In this example, the work phase reference k2 is shifted from the phase zero position reference k1 of the chuck portion 18 to the side opposite the rotation of the chuck portion 18 by an angle θ0. Here, the phase reference k2 is an imagined one fixedly specified on the work w.

Next, in step S102, the drive device 20a displaces one center 21 toward the other center 19 and puts these centers 19, 21 into center holes comprising conical female faces formed in end faces of the work w, respectively. Therefore, the work w is supported by the centers 19, 21, and thereafter, the work w is released from the keeping position due to the robot, the automatic feed device or the manual controls and the like so as to protect the circumference thereof from the next operation. Then, the drive device 20a has the center 21 push toward the center 19 by further strong force. Therefore, the work w is surely put between the centers 19, 21 to have the rotation center agree with the specific axis S exactly. In addition, at the same time, one end face of the work w is pushed toward a work longitudinal reference face 18b formed near the center of the chuck portion 18 and perpendicular to the specific axis S, and the position on the specific axis S direction is fixed. Under this situation, the claws 18a clamp the outer periphery of one end of the work w.

Thereafter, in step S103, the program for determining a phase is started. The numerical control mechanism 4 displaces the spindle housing to the predetermined position, and the reference block 9 is displaced and stopped at the phase adjustment position p2. In the displaced reference block 9, the center in the X-axis direction is positioned at about the center of the length of a specified crank pin w1. Besides, as shown in FIG. 6, an intersection point p3 between the first plane face 9a and the second plane face 9b is turned to a radial direction of the specific axis S and situated on the Z-axis and the Y-axis to be positioned on a line L1 inclined in right rise by 45° against these axes. Moreover, the first plane face 9a and the second plane face 9b are respectively positioned on a rotation displacement locus of the crank pin w1 around the specific axis S. Besides, the phase adjustment position p2 showing an example can be exchanged to another position suitably. This will be described later in detail.

Next, in step S104, the NC table 16 is operated to feed-rotate the work w in a normal rotation direction around the specific axis S with the chuck portion 18. When the crank pin w1 abuts the first plane face 9a of the reference block 9 as shown in FIG. 6, the abutment is detected to stop the NC table 16 from operating. In this case, the rotation angle θ1 of the chuck portion 18 at the time of this abutment is recognized and memorized in the numerical control mechanism 4. The rotation angle θ1 is the angle from the table phase reference p0 to the phase zero position reference k1 of the chuck portion 18 at the time of the abutment.

In this case, the abutment between the crank pin w1 and the first plane face 9a is detected directly by a torque sensor when torque transmitted from the work drive portion 14 to the chuck portion 18 increases or indirectly by drive amperometry of the work drive portion 14.

Next, in step S105, it is discriminated whether a highly accurate operation will be required in the operation of determining the phase for the work. In this case, the standard for discrimination depends on the operator's judgement.

When it is decided that the highly-accurate operation is unnecessary, the process is displaced to step S106, whereas when it is decided that the operation is necessary, the process is displaced to step 107.

In the step S106, the rotation angle of the work w in after adjusting the phase is corrected in accordance with the rotation angle θ1 of the chuck portion 18 at the time of the abutment between the reference block 9 and the crank pin w1.

Specifically, the rotation angle θ1 is calculated by data such as a rotation radius around the specific axis S at the center of the crank pin w1, the diameter of the crank pin and the position of the first plane face 9a of the reference block 9. Here, the calculated rotation angle from the table phase reference p0 of the chuck portion 18 is assumed to be θ10.

Next, the rotation angle θ10 is deducted from the rotation angle θ1 of the chuck portion 18 calculated in the step S104. This calculated difference value θ12 agrees with the angle θ0 from the work phase reference k2 to the phase zero position reference k1 of the chuck portion 18 if there is no machining error. And this is handled as a phase shift angle between the chuck portion 18 and the work w, and made the amount of correction in determining the phase for the work w. Accordingly, a rotation angle θt of the chuck portion 18 for determining the phase for the work w, such as rotating the work phase reference k2 from the table phase reference p0 by a specified angle θw only, is calculated by the following formula (1). Here, the rotation angle θt is the angle through which the phase zero position reference k1 of the chuck portion 18 rotates from the table phase reference p0 in the normal rotation direction f1.

$$\theta t = \theta w + \theta 12 \quad \text{Formula (1)}$$

According to the formula (1), when positioning the work w at the place of an optional specified angle θw in the after work machining, the rotation angle θt requires the size obtained by adding the difference value θ12 to the angle θw. This operation is automatically carried out by the numerical control mechanism 4.

In the case of determining the phase for the work w like this, when the shape data input into the numerical control mechanism 4 exactly agree with the actual work w, the phase for the work w around the specific axis S can be exactly determined. However, for example, when the diameter of the crank pin w1 is different from the input shape data, an error is caused in proportion to the difference. In addition, when there are unintentional irregularities on the periphery of the crank pin w1, an error is caused in proportion to the dimensions thereof in the radial direction.

On the other hand, when the operation is displaced to step S107, the following operation will be carried out.

The NC table 16 is operated in the reverse direction to the case in the step S104, and the work w is feed-rotated with the chuck portion 18 in a reverse rotation direction f2 around the specific axis S. And, when the crank pin w1 abuts to the second plane face 9b of the reference block 9 as shown in FIG. 7, the abutment is detected, and thereafter, the operation is stopped. A rotation angle θ2 from the table phase reference p0 of the chuck portion 18 at the time of the abutment is recognized and memorized in the numerical control mechanism 4. The rotation angle θ2 is an angle from the table phase reference p0 to the phase zero position reference k1 of the chuck portion 18 at the time of the abutment.

In this case, the abutment between the crank pin w1 and the first plane face 9a can be detected in the same way as in the case of the step S104.

Next, in step S108, an angle value θ3 is calculated by dividing the value adding the rotation angle θ1 in the step S104 and the rotation angle θ2 in the step S107 by 2.

Lastly, the operation is displaced to step S109, and therein, the angle value θ3 is memorized in the numerical control mechanism 4, and based thereon, the rotation angle of the work w in after determining the phase for the work w can be corrected.

More specifically, the rotation angle θ2 of the chuck portion 18 at the time of the abutment between the reference block 9 and the crank pin w1 in the step S108 is calculated by data such as the rotation radius around the specific axis S at the center of the crank pin w1, the diameter of the crank pin w1, and the position of the first plane face 9a of the reference block 9. Here, the calculated rotation angle from the table phase reference p0 of the chuck portion 18 is assumed to be θ20.

Next, a difference value θ22 is calculated by adding the rotation angle θ20 and the rotation angle θ10, dividing it by 2, and subtracting the divided angle value from the angle value θ3. The value θ22 accurately agrees with the angle θ0 from the work phase reference k2 to the table phase reference p0 when the phase zero position reference k1 of the chuck portion 18 agrees with the table phase reference p0. Therefore, the value θ22 is handled as the phase shift angle between the chuck portion 18 and the work w to be made the amount of correction in determining the phase for the work w. Accordingly, the rotation angle θt of the chuck portion 18 for an operation to determine the phase for the work w, such as rotating the work phase reference k2 from the table phase reference p0 by a specified angle θw only, is calculated by the following formula (2).

$$\theta t = \theta w + \theta 22 \quad \text{Formula (2)}$$

According to formula (2), when positioning the work w at the place of an optional specified angle θw in the after work machining, the rotation angle θt requires the size obtained by adding the difference value θ22 and the angle θw. This operation is automatically carried out by the numerical control mechanism 4.

In this operation, even if the diameter of the crank pin w1 is different from the shape data input into the numerical control mechanism 4, the work w can be positioned in the place of a desired angle θw without being influenced by the error. Even if the crank pin w1 is machined in a section of polygonal shape by a crankshaft mirror or has unintentional irregularities on the periphery, the degree of influence that the error of the diameter of the crank pin w1 exerts on positioning the work w to the place of the desired angle θw is greatly reduced. Therefore, the work w is positioned at the place of the desired angle θw more accurately than in the case of the step S106.

In the operations at all steps of the above-mentioned example, it can be suitably decided which operations will be operated by hand and which operations will be automatically carried out.

A modification of the above-mentioned example will be explained as follows with reference to FIG. 8 and the like. Here, FIG. 8 is an explanatory view showing a modification concerning a phase adjustment position p2 of the reference block 9.

(1) In the above-mentioned example, the intersection point p3 of the reference block 9 is turned to the radial direction of the specific axis S and situated on the Z-axis and the Y-axis to be positioned on the line L1 inclined in right rise by 45° against these axes. In this case, although the correction amount in determining the phase for the work w can be calculated only by displacing the reference block 9 to the phase adjusting position p2 at a time, this method is not necessarily the most accurate. Therefore, to improve the accuracy in determining the phase for the work, the operations may as well be performed as follows.

Figure 8:
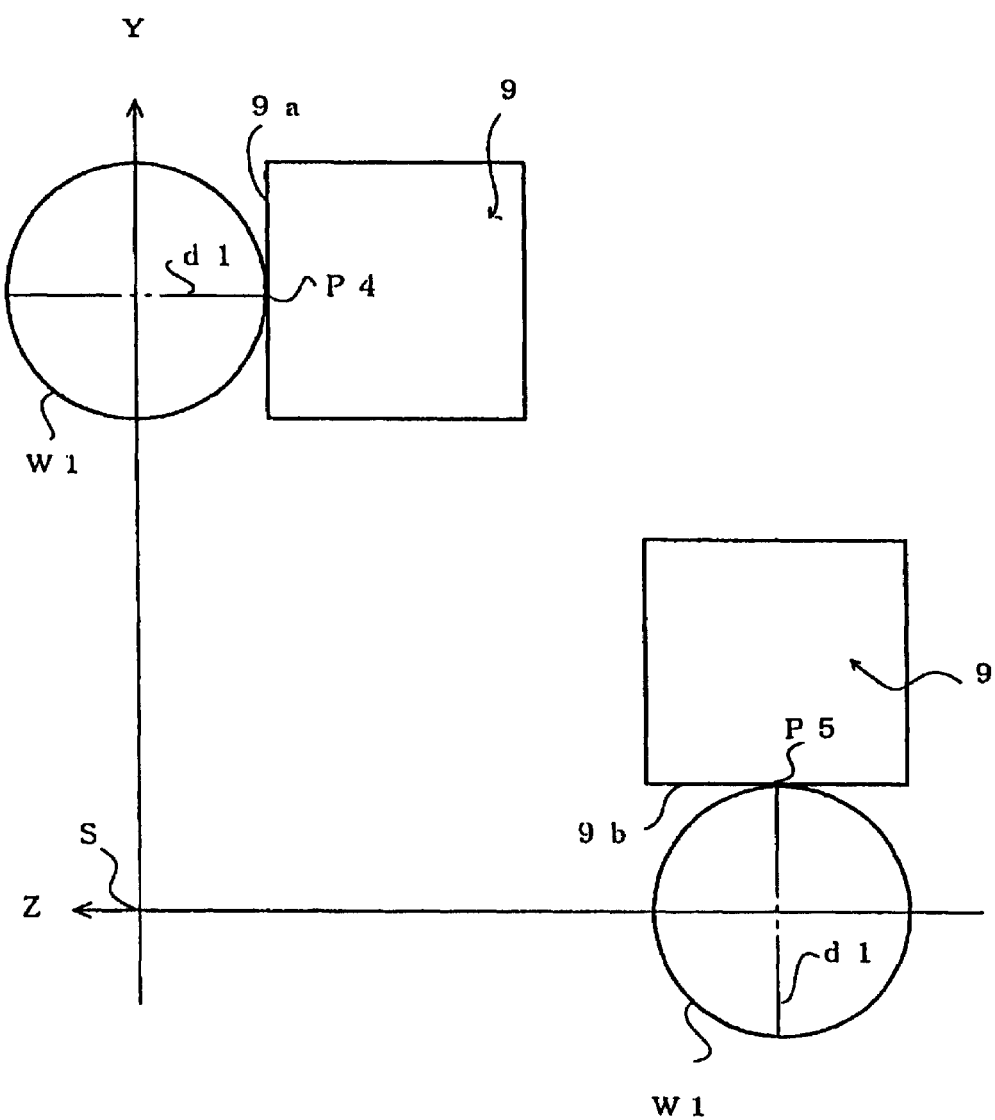
FIG. 8 is an explanatory view of a modification concerning a phase adjustment position of the reference block.

That is, as shown in FIG. 8, the reference block 9 is arranged in the place where the periphery of the crank pin w1 point-abuts the first plane face 9*a* when the work phase reference k2 agrees with the table phase reference p0, and the operation in the step S104 is carried out to detect the rotation angle θ1 of the chuck portion 18. In addition, the reference block 9 is arranged in the place where the periphery of the crank pin w1 point-abuts the second plane face 9*b* when the work phase reference k2 rotates from the table phase reference p0 to the reversal direction f2 by 270°, and the operation in the step S1107 is carried out to detect the rotation angle θ2 of the chuck portion 18.

According to this, one end p4 of the specified diameter line d1 of the crank pin w1 abuts the first plane face 9*a* and the other end p5 thereof abuts the second plane face 9*b*. Accordingly, an error in the diameter direction of the crank pin w1 is surely eliminated, thereby improving the accuracy for determining the phase for the work w.

(2) In the step S104, although the difference value θ2 is calculated by point-abutting the periphery of the crank pin w1 against the first plane face 9*a*, the periphery may be point-abutted against the second plane face 9*b* instead of the first plane face 9*a*.

(3) When calculating the rotation angles θ1 and θ2 of the chuck portion 18, the reference block 9 can be arranged at a suitable place excepting the above-mentioned position within the range of the present invention.

According to thus constructed invention, the following effects can be achieved.

The usual operation of mounting/dismounting the reference tool on the spindle 6 is dispensed with, thereby improving the work efficiency. In addition, the usual storage space for the reference tool is dispensed with, thereby achieving an inexpensive structure. Moreover, since the force of the work w does not directly influence the spindle 6, the life of the bearing for supporting the spindle 6 can be prolonged.

Furthermore, the following effects can be realized in addition to the above-mentioned effects. The accuracy for determining the phase for the work w can be improved by using the first plane face 9*a* and the second plane face 9*b*. For example, even if the finishing accuracy of the diameter of the crank pin w1 is different from every work w, the phase for the work w can be decided exactly. In addition, for example, even if the work w includes the crank pin w1 machined by the crankshaft miller to be microscopically shaped in a polygon, the phase for the work can be decided accurately.

In addition, also in determining the phase for the crankshaft w1, such effects can be achieved. Moreover, the phase for the crankshaft w1 can be decided without a special phase reference section by using the crank pin w1 as a work phase reference section.

Furthermore, the phase for the work w around the specific axis S can be decided easily and flexibly by using the first plane face 9*a* or the second plane face 9*b*. In addition, it can be decided accurately in spite of any finishing dimension error of the phase reference section w1 of the work w by abutting the phase reference section (the crank pin w1) of the work w against both of the first plane face 9*a* and the second plane face 9*b*.

The invention claimed is:

1. In a machine tool in which a spindle housing supporting a specifically directed spindle for rotation is supported for motion by a numerical control mechanism, in determining a phase of a work to be feed-rotated around a specific axis, a work phase determination method for machine tools comprising:

fixing a reference block to the spindle housing of the spindle, said reference block comprising a first plane face, installing an NC table of the numerical control mechanism on a work support-feeding device, feed-rotating the work around the specific axis, and correcting a rotation angle of the work in accordance with a rotation angle of the NC table at a time of an abutment between a phase reference section of the work and the reference block.

2. In a machine tool in which a spindle housing supporting a specifically directed spindle for rotation is supported for motion by a numerical control mechanism, a work phase determination device comprising:

a reference block fixed below and in vertical alignment with the spindle, the reference block having a first plane face perpendicular to a direction of the spindle and a second plane face parallel to both the direction of the spindle and the specific axis;

a work support-feeding device comprising an intermediate table having a top face with opposite ends, a work driving table fixed on one end of the top face of the intermediate table, and a center push table fixed on the other end thereof, said work driving table having an NC table and a table main body fixed on the intermediate table;

a chuck portion, supported on the table main body, rotatively driven around a specific axis in an X-axis direction by the NC table; and a drive center supported on the table main body and positioned on the specific axis, the drive center supporting a rotation center of an end of a work grasped by the chuck portion, the work having a phase reference section, wherein, in feed-rotating the work around the specific axis, a rotation angle of the work is corrected in accordance with a rotation angle of the NC table at a time of an abutment between the phase reference section of the work and the reference block.

3. A work phase determination method for machine tools as set forth in claim 1, wherein said reference block is arranged below and in vertical alignment with the spindle, at the lowest position of the spindle housing.

4. A work phase determination method for machine tools as set forth in claim 1, wherein said first plane face is perpendicular to a first direction of the spindle, said reference block has a second plane face parallel to both the direction of the spindle and the specific axis, and the work is feed rotated in either a first direction or a second, opposite direction around the specific axis to abut the phase reference section of the work against either or each of the first plane face and the second plane face, so as to find the amount of feed-rotation of the work at the time of the abutment.

5. A work phase determination method for machine tools as set forth in claim 4, wherein the work is feed rotated in both the first direction and the second, opposite direction around the specific axis to abut the phase reference section of the work against each of the first plane face and the second plane face, so as to find the amount of feed-rotation of the work at the time of the abutment.

6. A work phase determination method for machine tools as set forth in claim 1, wherein the rotation angle of the work is corrected in accordance with a rotation angle of the NC table at a time of an abutment between a phase reference section of the work and said first plane face of the reference block.

7. A work phase determination method for machine tools as set forth in claim 1, wherein said spindle housing is supported for parallel motion in orthogonal three-axis directions XYZ by the numerical control mechanism.

8. A work phase determination device as set forth in claim 2, wherein said spindle housing is supported for parallel motion in orthogonal three-axis directions XYZ by the numerical control mechanism.

9. A work phase determination device as set forth in claim 2, wherein the rotation angle of the work is corrected in accordance with a rotation angle of the NC table at a time of an abutment between a phase reference section of the work and said first plane face of the reference block.

* * * * *